E. E. & J. A. SOWELL.
BALL BEARING LOCK NUT.
APPLICATION FILED MAR. 30, 1917.
1,267,927.
Patented May 28, 1918.
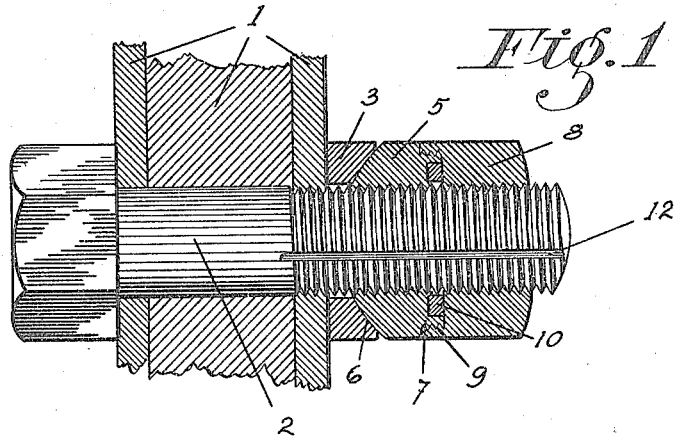
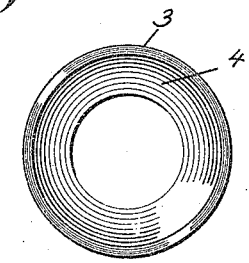
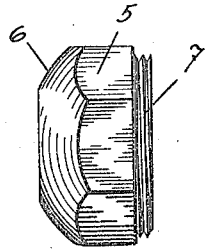
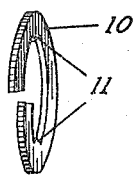
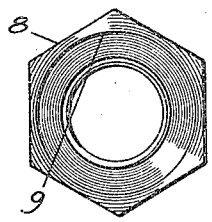
WITNESS:
Bernard Privat
INVENTORS
John A. Sowell & Ernest E. Sowell
BY
ATTORNEY.

UNITED STATES PATENT OFFICE.

ERNEST E. SOWELL AND JOHN A. SOWELL, OF SACRAMENTO, CALIFORNIA.

BALL-BEARING LOCK-NUT.

1,267,927.             Specification of Letters Patent.       Patented May 28, 1918.

Application filed March 30, 1917. Serial No. 158,565.

*To all whom it may concern:*

Be it known that we, ERNEST E. SOWELL and JOHN A. SOWELL, citizens of the United States, residing at Sacramento, in the county of Sacramento, State of California, have invented certain new and useful Improvements in Ball-Bearing Lock-Nuts; and we do declare the following to be a full, clear, and exact description of the same, reference being had to the accompanying drawings, and to the characters of reference marked thereon, which form a part of this application.

This invention relates to improvements in lock nuts. The object of this invention is to produce a nut which, when it is mounted upon the bolt cannot of itself creep backwardly off the bolt. All nuts of the types now commonly used will shake loose on the bolt and away from the parts held together by the bolt due to the vibration of the machinery or other elements to which bolts and nuts may be applied. This is due to a very large degree to the fact that the surface against which the nut impinges is rough and the inner face of the nut is usually rough and these two rough surfaces working against each other tend to act as a driver to drive the nut backwardly from the bolt and thus loosen it. This we intend to overcome by having first a socketed washer which fits over the bolt and impinges against the parts to be bolted, the socket being made perfectly smooth and true. We then provide the lock nut having one of its parts formed into a half ball shape which half ball shape fits into this socketed washer. The face of this half ball shaped portion of the nut is likewise made perfectly smooth and true so that when it fits in the socketed washer there will be perfect ball bearing contact between the two with no possibility of any rough surfaces engaging each other. Thus the objection that the rough surfaces drive against each other and tend to loosen the nut will be removed. The lock nut proper is then formed of such structure that it will not itself tend to creep off of the bolt but will be held in a positive fixed position thereon by means of the lock washer structure as hereinafter shown.

A further object of the invention is to produce a simple and inexpensive device and yet one which will be exceedingly effective for the purposes for which it is designed.

These objects we accomplish by means of such structure and relative arrangement of parts as will fully appear by a perusal of the following specification and claim.

In the drawings similar characters of reference indicate corresponding parts in the several views.

Figure 1 is a side elevation of the bolt and our improved ball bearing lock nut shown thereon in section.

Fig. 2 is a face view of the socketed washer.

Fig. 3 is a complete side view of the ball bearing portion of the lock nut.

Fig. 4 is a perspective view of the spring lock washer.

Fig. 5 is a face view of the nut proper showing the recess to receive lock washer shown in Fig. 4.

Referring now more particularly to the characters of reference on the drawings the numeral 1 designates the parts which may be bolted together which may of course be any form of mechanical or other structure. The numeral 2 designates the bolt.

The numeral 3 designates the socketed washer which is provided in its outer face with a cupped out socket 4. The numeral 5 designates the ball bearing portion of the lock nut the inner face 6 of which is formed into a semi circular shape arranged for smooth engagement in the socket 4. This member 5 is threaded so that it can be screwed upon the bolt and is provided on its outer face with a projecting annular shoulder 7.

The numeral 8 designates the nut proper which is provided with an annular recess 9 in its inner face adapted to receive the lock washer 10. This lock washer 10 is a split spring washer provided with lugs 11 which fit into the longitudinal groove 12 on the bolt 2 which construction prevents the washer 10 from turning on the bolt. When the nut 8 is mounted upon the bolt it forces the washer 10 so that its sprung ends lie in the same plane and fit snugly between the end of the nut 5 and the bottom of the recess 9. When in this position the said washer 10 is under tension, which tension presses both against the nut 5 and the nut 8 and holds them in frictional contact with the threads of such bolt. The said washer 10 is completely inclosed within the recess 9 and a tight joint between all the parts is made by reason of the fact that the sides of the recess 9 fit around the shoulder 7 so that when the entire device is mounted on the bolt it is fully protected from dirt and moisture. The said sides of the recess 9 are threaded as is likewise the shoulder 7 so that when mounted one upon the other these threads engage. This makes a tight joint and also enhances the locking function.

The ball bearing feature as already shown prevents any of the direct vibration of the bolted parts from tending to loosen the nut 5. Since the nut 5 itself cannot tend to loosen and since it and the nut 8 are both held in relative frictional engagement against the threads of the bolt, this tends to permanently prevent either of the nuts from shaking loose on the bolt.

From the foregoing description it will be readily seen that I have produced such a device as substantially fulfills the object of the invention as set forth herein.

While this specification sets forth in detail the present and preferred construction of the device, still in practice such deviations from such detail may be resorted to as do not form a departure from the spirit of the invention as defined by the appended claims.

Having thus described our invention what ws claim as new and useful and desire to secure by Letters Patent is:

A nut lock comprising two members, one having a projecting threaded shoulder forming a recess in its face, the other having a threaded recess whereby it may be mounted upon the threaded shoulder to inclose the recess in the first named member to render it dirt and moisture proof, and a split spring washer arranged to be disposed in said inclosed recess and engage the two nut members.

In witness whereof, we affix our signatures in the presence of two witneses.

ERNEST E. SOWELL.
JOHN A. SOWELL.

Witnesses to signature to Ernest E. Sowell:
CHAS A. BLISS,
HELEN L. WIEGER.

Copies of this patent may be obtained for five cents each, by addressing the "Commissioner of Patents, Washington, D. C."